(12) United States Patent
McPherson et al.

(10) Patent No.: US 10,392,172 B2
(45) Date of Patent: Aug. 27, 2019

(54) SECURITY CLOSURE

(71) Applicant: Obrist Closures Switzerland GmbH, Reinach (CH)

(72) Inventors: Alexander Donald Meiklem McPherson, Stirlingshire (GB); David Conway Richardson, Wrexham (GB)

(73) Assignee: Obrist Closures Switzerland GmbH, Reinach (CH)

( * ) Notice: Subject to any disclaimer, the term of this patent is extended or adjusted under 35 U.S.C. 154(b) by 0 days.

(21) Appl. No.: 15/310,759

(22) PCT Filed: May 13, 2015

(86) PCT No.: PCT/EP2015/060625
§ 371 (c)(1),
(2) Date: Nov. 12, 2016

(87) PCT Pub. No.: WO2015/173318
PCT Pub. Date: Nov. 19, 2015

(65) Prior Publication Data
US 2017/0081095 A1    Mar. 23, 2017

(30) Foreign Application Priority Data
May 14, 2014    (GB) .................................. 1408598.9

(51) Int. Cl.
*B65D 53/02*    (2006.01)
*B65D 47/02*    (2006.01)
(Continued)

(52) U.S. Cl.
CPC ........ *B65D 53/02* (2013.01); *B29C 45/14819* (2013.01); *B29C 45/1704* (2013.01);
(Continued)

(58) Field of Classification Search
CPC ...... B65D 53/02; B65D 1/0246; B65D 41/16; B65D 41/62; B65D 47/02; B65D 47/06;
(Continued)

(56) References Cited

U.S. PATENT DOCUMENTS 1,381,365 A  *  6/1921  Taliaferro .......... B65D 41/0442
                                                         215/337
1,929,884 A  *  10/1933  Fisher .................... A47L 25/08
                                                          15/231

(Continued)

FOREIGN PATENT DOCUMENTS

GB    1111656         5/1968
GB    1571938 A   *   7/1980  ............. B65D 41/18
(Continued)

*Primary Examiner* — Robert J Hicks
(74) *Attorney, Agent, or Firm* — Lightbulb IP, LLC (57) ABSTRACT

A security closure 5 for a container neck 40 comprises a body 25 formed from a plastics material and a metal retention member 10 formed integrally with the body 25. The metal retention member 10 remains on the container neck 40 for retaining the body 25 on the container neck 40. The metal retention member 10 makes it impossible or very difficult to remove the security closure 5 from the container neck 40 without breaking/damaging/destroying the container. The security closure 5 and a container having a container neck 40, and a method of forming the security closure 5 are also disclosed.

17 Claims, 6 Drawing Sheets

(51) Int. Cl.
  *B65D 1/02* (2006.01)
  *B65D 41/16* (2006.01)
  *B65D 41/62* (2006.01)
  *B65D 47/06* (2006.01)
  *B29C 45/17* (2006.01)
  *B29C 45/14* (2006.01)
  *B29K 69/00* (2006.01)
  *B29K 705/12* (2006.01)
  *B29L 31/56* (2006.01)

(52) U.S. Cl.
  CPC ............ *B65D 1/0246* (2013.01); *B65D 41/16* (2013.01); *B65D 41/62* (2013.01); *B65D 47/02* (2013.01); *B65D 47/06* (2013.01); *B29K 2069/00* (2013.01); *B29K 2705/12* (2013.01); *B29L 2031/565* (2013.01)

(58) Field of Classification Search
  CPC ...... B65D 45/322; B65D 45/32; B65D 45/18; B65D 41/3447; B65D 41/3428; B65D 17/4012; B65D 17/402; B65D 17/404; B65D 1/0238; B65D 1/023; B29C 45/14819; B29C 45/1704
  USPC ..... 215/352, 342, 40, 43, 44, 329, 316, 275, 215/274, 287, 280, 258, 253, 252, 254, 215/256, 49, 48, 47; 220/293, 288, 320, 220/319, 315, 268, 266, 265; 222/562, 222/544, 567, 566, 153.1; 264/46.7, 478, 264/513
  See application file for complete search history.

(56) References Cited

U.S. PATENT DOCUMENTS

| | | | | | |
|---|---|---|---|---|---|
| 2,078,862 | A | * | 4/1937 | Llewellyn | B43L 25/04 222/581 |
| 2,130,511 | A | * | 9/1938 | Selwyn | B65D 41/42 215/303 |
| 2,573,111 | A | * | 10/1951 | Irving Rossi | B65D 41/18 215/317 |
| 2,906,421 | A | * | 9/1959 | Jordanoff | B65D 41/18 215/321 |
| 2,915,404 | A | * | 12/1959 | Tessmer | B65D 51/28 215/228 |
| 3,208,649 | A | * | 9/1965 | Fields | B29C 45/1418 215/230 |
| 3,221,954 | A | * | 12/1965 | Lux | B29C 49/22 215/10 |
| 3,224,616 | A | * | 12/1965 | Fields | B65D 41/349 215/258 |
| 3,246,785 | A | * | 4/1966 | Welber | B65D 41/12 215/305 |
| 3,391,821 | A | * | 7/1968 | Satz | B65D 43/0212 220/284 |
| 3,470,927 | A | * | 10/1969 | Craig | B65D 1/26 215/352 |
| 4,437,593 | A | * | 3/1984 | Bullock, III | B65D 41/48 215/256 |
| 5,680,968 | A | * | 10/1997 | Moore | B65D 47/122 222/480 |
| 2005/0175810 | A1 | * | 8/2005 | Malmborg | B29C 45/14811 428/76 |
| 2005/0224507 | A1 | | 10/2005 | Gavin | |
| 2008/0110929 | A1 | * | 5/2008 | Stanley Traasdahl | B65D 47/06 222/109 |
| 2013/0119010 | A1 | * | 5/2013 | Martinez Ramirez | B65D 41/145 215/328 |

FOREIGN PATENT DOCUMENTS

GB          2176467          12/1986
WO     WO2014/045267        3/2014

* cited by examiner

SECURITY CLOSURE

BACKGROUND OF THE INVENTION

The present invention relates generally to a closure and particularly, although not exclusively, to a security closure for a container, or a closure component for a container.

SUMMARY OF THE INVENTION

According to an aspect of the present invention there is provided a security closure for a container, the closure comprising a body formed from a plastics material and a metal retention member for retaining the body on a container neck.

In some embodiments the invention relates to a closure or component which is intended not to be removable in use and/or to ways of making it impossible or more difficult to remove such closures. For example, the present invention may make it impossible or very difficult to remove a closure without breaking/damaging/destroying the container. The security closure may be fitted to the neck of a bottle and then a shell may be fitted over the body in use.

The retention member may be formed separately from and be attached or attachable to the body.

The retention member may be formed integrally with the body. For example the member may be moulded into the body.

In some embodiments the plastics component is moulded around a metal component, for example in an "outsert moulding" operation.

In one embodiment the closure comprises a metal clip added to a plastic moulding to increase its strength. In another embodiment a metal component is added to a moulding tool and plastics material is moulded around it. A plastics pouring fitment with a moulded-in metal retainer may be provided.

In embodiments in which a metal component is formed in the plastic closure and/or closure body the metal component may remain on a container (for example a neck finish) even if the closure is removed.

Then if an attempt to remove the metal component is made this may result in breakage/damage of the container.

The member may comprise one or more one-way clips.

For example the metal component may comprise a separate clip member that is attached or attachable to the plastics component.

The member may comprise a ring bearing one or more one-way retention clips.

In some embodiments the closure body may be formed as a pourer, pouring fitment or the like for example for use with a glass bottle (such as a spirits bottle). A shell or the like may be formed over the fitment.

The body may be formed from polycarbonate.

The member may be formed from steel.

In a further aspect the invention relates to a closure formed from a plastics material with a metal component provided on, in or by the plastics component.

A further aspect provides a security closure for a container, the closure comprising a body formed from a plastics material, the body having a wall thickness with hollow section.

The body may be formed by gas assist injection moulding.

The present invention also provides a method of forming a security closure for a container, the method comprising the steps of: injection moulding a body using a body using a plastics material; and injecting gas into the mould to form a hollow section for at least part of the body.

In some aspects and embodiments the invention relates to a closure for a glass container.

In another aspect the wall thickness of a plastics component is filled with gas. For example, gas (such as air, oxygen, carbon dioxide, nitrogen or argon) may be injected during an injection moulding process together with plastics material. This would produce, for example, a closure body with a hollow plastic section.

Gas assisted moulding involves the introduction of gas (for example nitrogen) under pressure to the mould cavity (either through a sprue or directly into a mould tool) at a set time during the moulding cycle.

If such a component is attacked by heat, for example, it would be destroyed and it could not be re-used.

Closures formed according to the present invention may comprise a flow regulator and/or a one-way valve.

The closure/closure body may be snap-fittable onto a container neck, for example with windows that include a retention clip/lug to engage under a bead on a container neck.

The security closure may comprise one or more windows into which beads formed on a container neck engage. The windows define ledges which engage under the beads. In some embodiments the retention members extend into/through the ledges. This allows, for example, for a metal clip (extending through a ledge) also to engage under the bead.

The present invention also provides a closure as described herein in combination with a container.

The present invention also provides a container fitted with a closure as described herein. The container may be a glass bottle, for example a spirits (such as whisky or vodka) bottle.

Different aspects and embodiments of the invention may be used separately or together. For example, a closure may be provided with a metal component and/or a gas injection body.

Different aspects and embodiments of the invention may be used separately or together.

Further particular and preferred aspects of the present invention are set out in the accompanying independent and dependent claims. Features of the dependent claims may be combined with the features of the independent claims as appropriate, and in combination other than those explicitly set out in the claims.

BRIEF DESCRIPTION OF THE DRAWINGS

The present invention will now be more particularly described, by way of example, with reference to the accompanying drawings, in which.

DETAILED DESCRIPTION OF THE INVENTION

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

Figure 1:
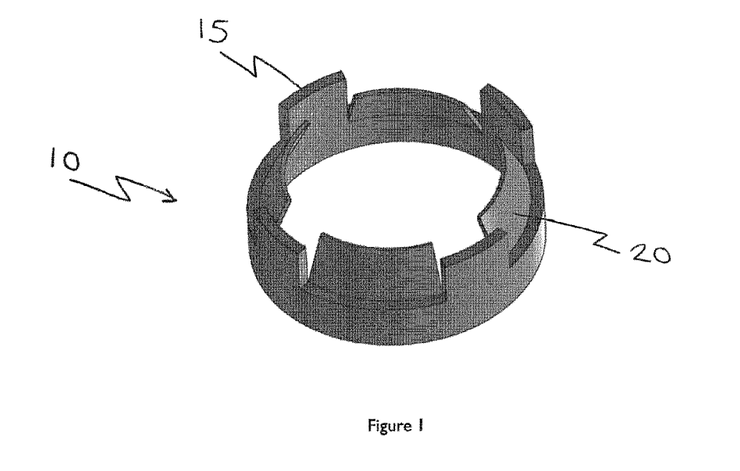
FIG. 1 shows a security spring clip ring formed in accordance with the present invention.

FIG. 1 shows a clip ring generally indicated 10. The ring 10 comprises a generally annular metal (in this embodiment steel) body with a castellated finish including a plurality of (in this embodiment four) upstanding tabs 15 and a plurality of (in this embodiment four) inclined clips 20.

Figure 2:
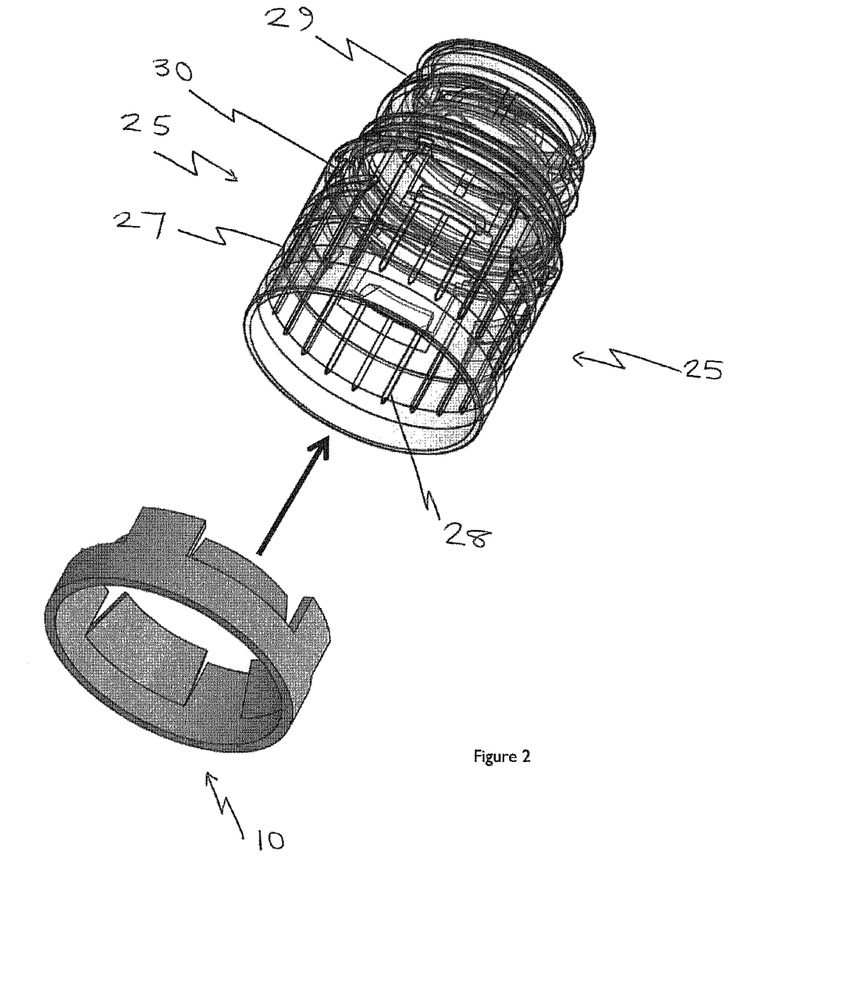
FIG. 2 shows the ring of FIG. 1 being inserted into a security closure body formed in accordance with the present invention.

Referring now to FIG. 2, the ring 10 is shown offered up to a security closure body 25.

The body 25 is generally cylindrical and comprises a lower engagement portion 27 and an upper flow regulation portion 29. The lower portion 27 comprises a generally cylindrical body having a plurality of (in this embodiment six) windows 30 each of which has at a lower edge a ledge 32.

The interior surface of the lower portion 27 has a plurality of mutually spaced axial ribs 28.

Figures 3, 4:
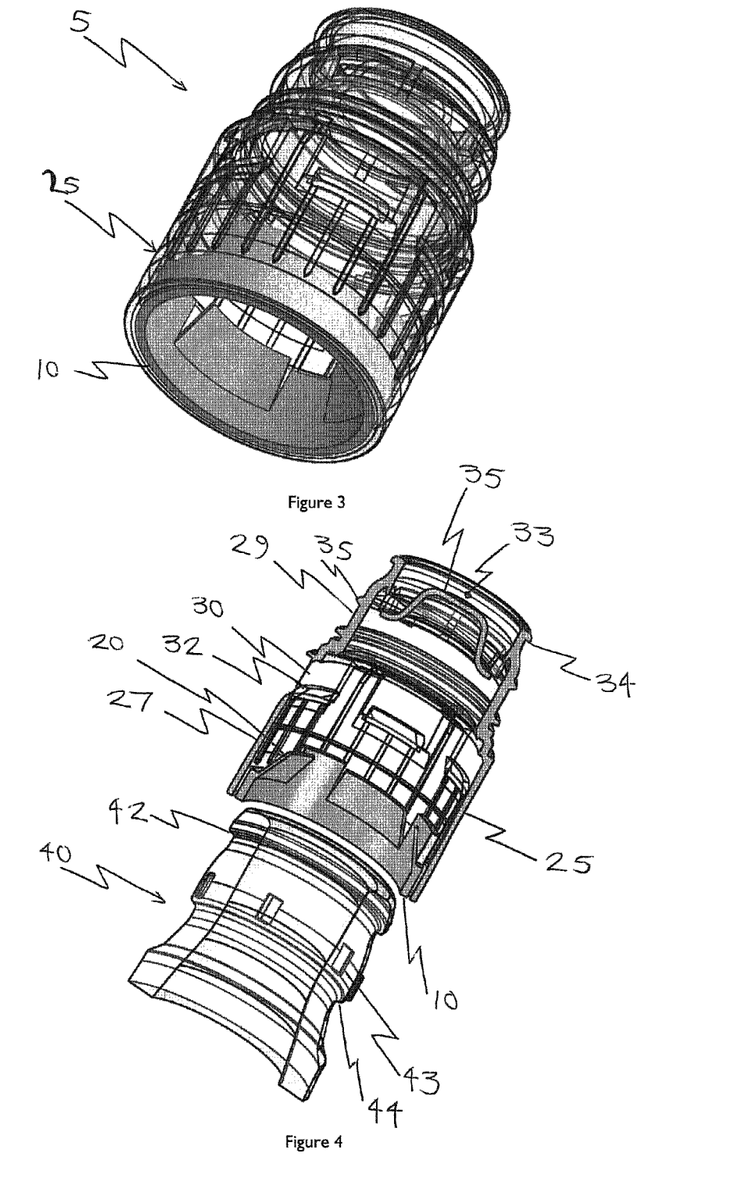
FIG. 3 shows the ring assembled into the body.
FIG. 4 shows the assembly of FIG. 4 presented to a container neck.

In use the ring is pushed up into the free end of the portion 27 to form a security closure 5, as shown in FIG. 3.

The upper portion 29 of the main body 25 is generally frusto-conical in shape and defines a pouring aperture 33. The exterior of the portion 29 and has external screw threads 35 (so that it can receive a screw threaded cap). A dome-shape flow regulator 37 is positioned in the aperture. The aperture 33 itself is defined by a circumferential pouring lip 34.

In FIG. 4 the body 25 fitted with the ring 10 is shown offered up to the neck finish 40 of a glass bottle.

The finish 40 includes a mouth 41 with a rim 42, a plurality of circumferentially spaced ribs 43, and a step 44.

In use the security closure 5 is snap-fitted onto the neck 40. The inclined clips flex radially outwards to allow them to pass over the rim 42 and the ribs 43, and then after they pass the step 44 they spring back so that they lock under the step and cannot pass back over. At the same time the ledges 32 lock under the rim 42. The ribs 28 also abut against the formations 43 the outer surface of the container neck in use to prevent relative rotation between the container neck and the body. A closure shell (not shown) may be fitted over the closure 5.

Figure 5:
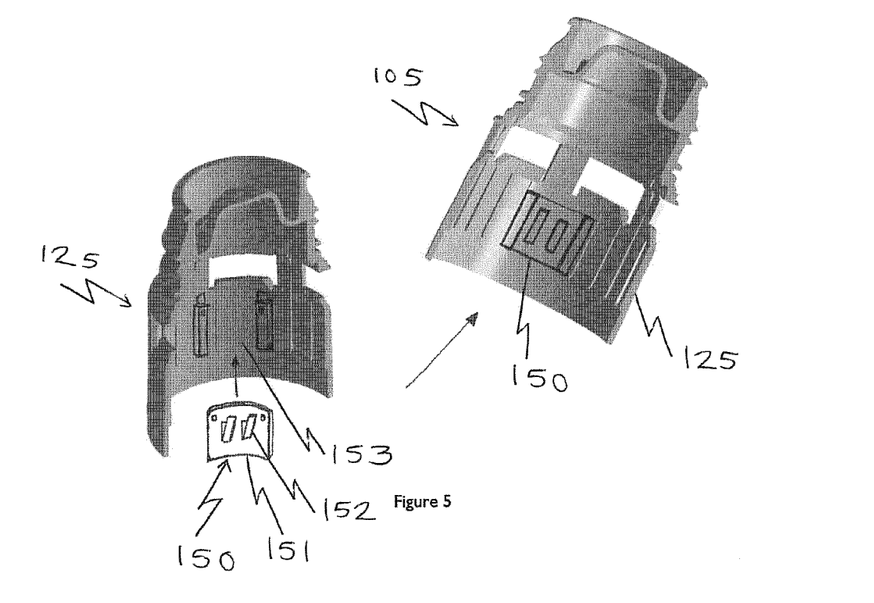
FIG. 5 illustrates a spring clip and pouring fitment formed according to a further embodiment.

Referring now to FIG. 5 there is shown a further embodiment. A closure body 125 is provided and is similar to the body 25. In this embodiment a separate spring clip 150 is provided. The clip includes a generally square base 151 (curved to match the interior curvature of the body) and two projecting prongs 152.

The lower end of the body portion 127 is provided with a slot 153 which receives the clip 150.

In other embodiments more than one one-way clip is provided.

Figure 6:
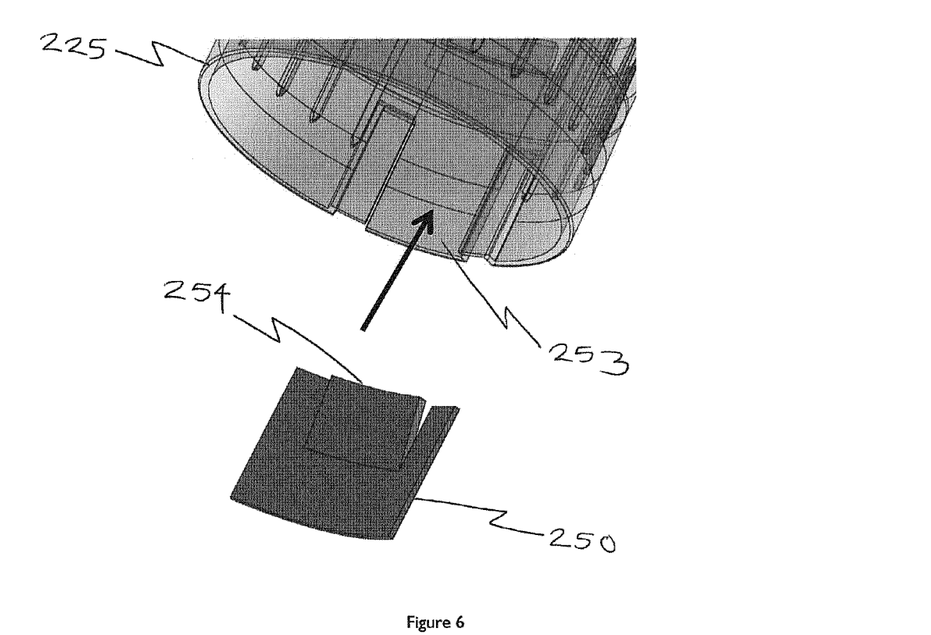
FIG. 6 illustrates a spring clip and external fitment formed according to a further embodiment.
Figure 7:
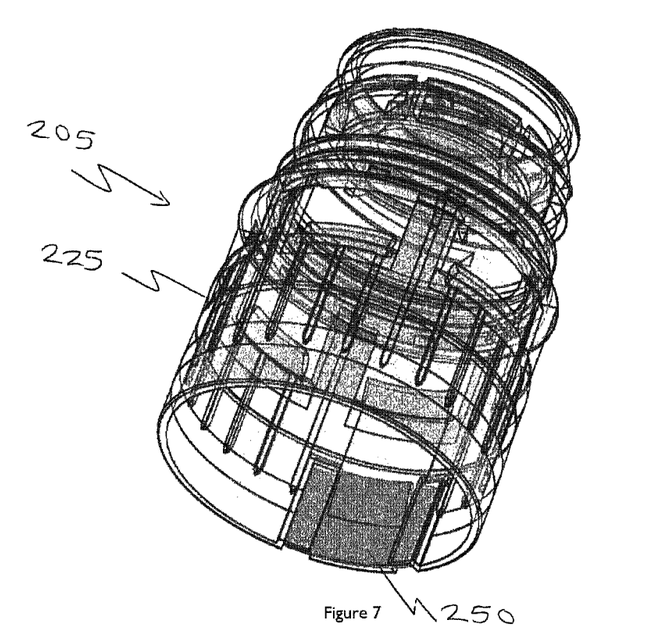
FIG. 7 shows the clip of FIG. 6 inserted into the fitment.
Figure 8:
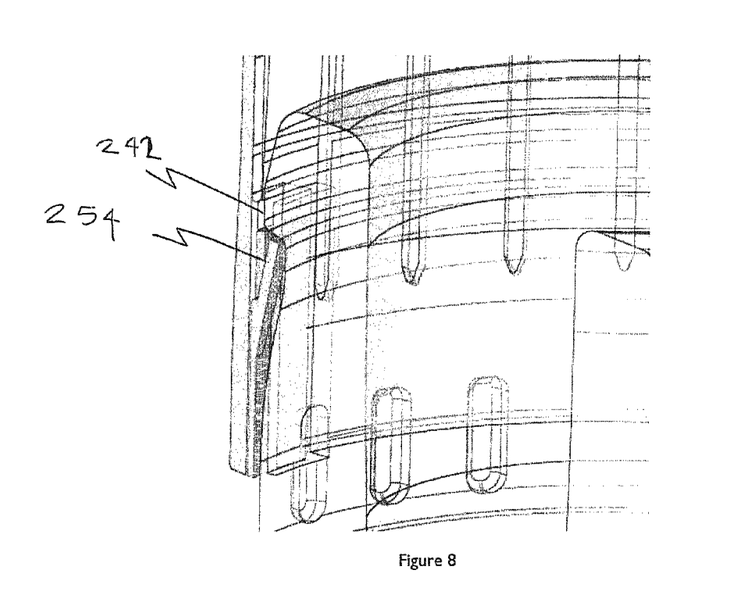
FIG. 8 shows a magnified view of the region of the clip of FIG. 7 when the fitment is attached to a container neck.

In FIGS. 6 to 8 a further embodiment is shown. In this embodiment a closure body 225 is again provided with a slot 253 which receives a retention clip 250. The clip comprises a single inclined flap 254. The clip is push fitted up into the slot (FIG. 7) and then in use the closure 205 is pushed onto a container neck 240. The clip flap is bent outwards as it passes over the neck rim 242. In this embodiment the flap 254 locks under the rim 242; in other embodiments the closure is adapted to be pushed further onto the neck so that ledges engage under the rim, and the clip engages under a different bead, step or the like on the neck.

Figure 9:
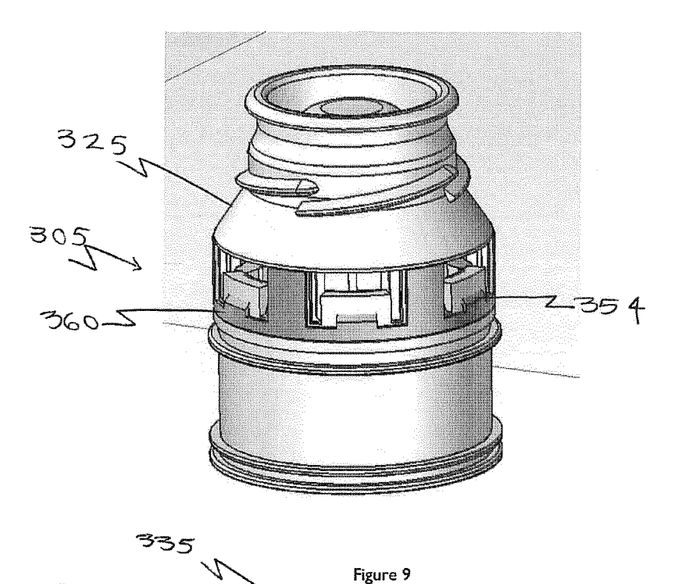
FIG. 9 shows a security closure formed according to a further embodiment.

In FIG. 9 a closure 305 formed according to a further embodiment is shown.

The closure 305 includes a pouring body fitment 325. In this embodiment a generally annular metal retention insert 360 is provided.

The insert 360 comprises a band 361, a plurality of spaced upright tabs 362 interspersed by a plurality of inclined retention flaps 354.

The body is moulded around the insert so that flaps 354 extend in to body ledges 332.

Figure 10:
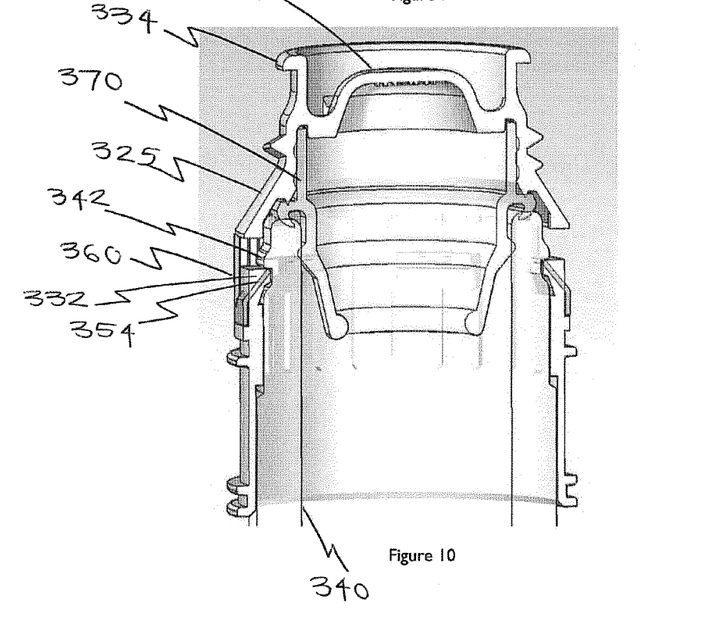
FIG. 10 shows the closure of FIG. 9 fitted onto a container neck finish.

When the closure 305 is fitted onto a container neck (FIG. 10) the ledges 332 lock under a neck finish bead. Any attempt to remove the closure will result in breakage of the plastics components. The metal insert 360 will remain on the finish.

In this embodiment an additional flow regulation component 370 is positioned in the fitment body 225.

Figure 11:
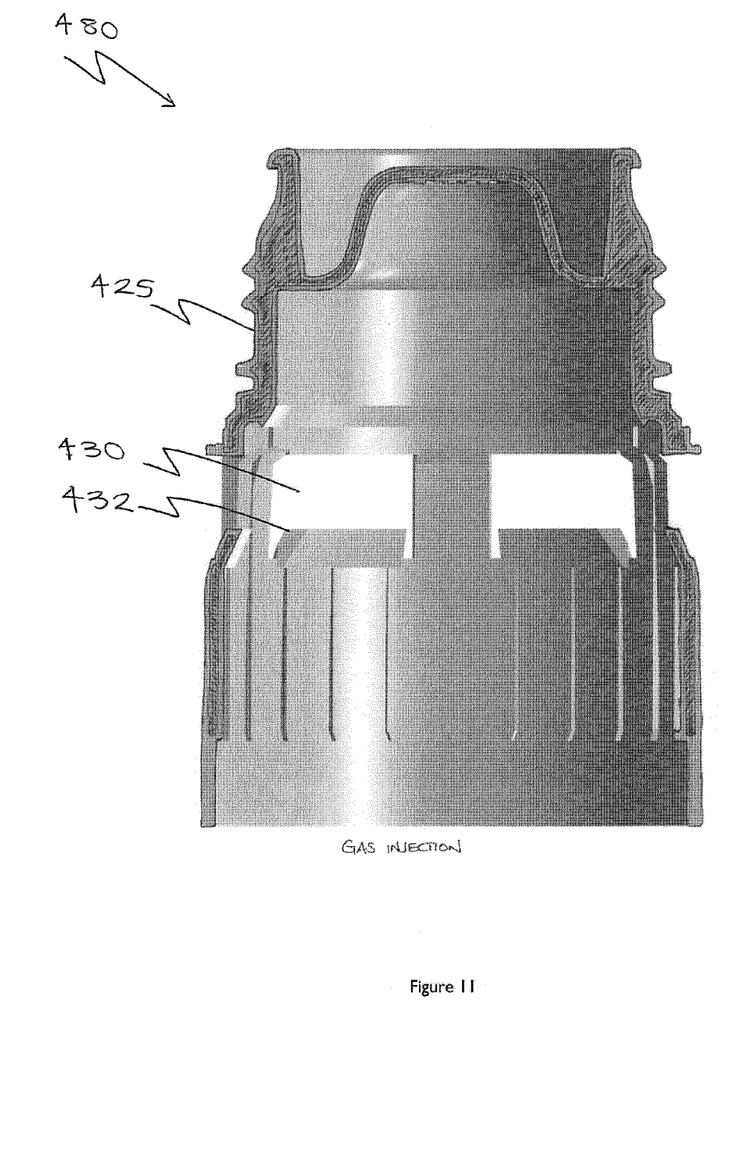
FIG. 11 is a section of a security closure formed according to a further aspect of the present invention.

Referring now to FIG. 11 a security closure 480 formed according to a further aspect is shown.

The closure 480 comprises a body 425 similar to the body 25 in that it includes a lower attachment portion 427 and an upper pouring portion 429. The attachment portion 427 also includes window 430 and ledges 432.

In this embodiment the body 425 is formed by a gas assist injection moulding process in which the wall thickness is filled with gas (which may subsequently be vented) to form a hollow section. The body is snap-fittable onto a container neck. If the closure is attacked, for example, by heat (a common method of trying to remove such closures) the component is destroyed and is not reusable.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention.

The invention claimed is:

1. A security closure for a container neck, the security closure comprising a body formed from a plastics material, and a metal retention member formed integrally and irremovably with the body, the metal retention member arranged in use to irremovably remain on a container neck for retaining the body on the container neck to prevent removal of the body from the container neck.

2. The security closure of claim 1, wherein the body is formed as a pouring body fitment comprising a lower engagement portion and an upper flow regulation portion.

3. The security closure of claim 2, wherein an additional flow regulation component is positioned in the pouring fitment body.

4. The security closure of claim 1, wherein the body is formed from polycarbonate.

5. The security closure of claim 1, wherein the metal retention member is formed from steel.

6. The security closure of claim 1, wherein the body has a wall thickness with a hollow section.

7. The security closure of claim 6, wherein the body is a gas assisted injection molded structure.

8. A method of forming the security closure of claim 6, comprising a step of forming the body by a gas assisted injection molding process.

9. The security closure of claim 1 and a container having a container neck.

10. The security closure of claim 9, wherein the container is a glass bottle.

11. The security closure of claim 9, wherein the security closure is snap-fitted onto the container neck.

12. The security closure of claim 9, wherein a shell is fitted over the body.

13. The security closure of claim 1, wherein the metal retention member is a generally annular metal retention insert.

14. The security closure of claim 13, wherein the generally annular metal retention insert comprises a band and a plurality of spaced upright tabs interspersed by a plurality of inclined retention flaps.

15. The security closure of claim 14, wherein the body comprises body ledges for locking under a neck finish bead of a container neck and the inclined retention flaps of the generally annular metal retention insert extend into the body ledges of the body.

16. The security closure of claim 1, wherein the body is molded around the metal retention member.

17. A method of forming the security closure of claim 1, comprising a step of molding the body around the metal retention member.

* * * * *